United States Patent
Hewitt et al.

(10) Patent No.: US 9,596,087 B2
(45) Date of Patent: *Mar. 14, 2017

(54) TOKEN AUTHENTICATION FOR TOUCH SENSITIVE DISPLAY DEVICES

(71) Applicant: International Business Machines Corporation, Armonk, NY (US)

(72) Inventors: Trudy L. Hewitt, Cary, NC (US); Francesco C. Schembari, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/821,913

(22) Filed: Aug. 10, 2015

(65) Prior Publication Data

US 2016/0156473 A1   Jun. 2, 2016

Related U.S. Application Data

(63) Continuation of application No. 14/556,697, filed on Dec. 1, 2014.

(51) Int. Cl.
*H04L 29/06* (2006.01)
*H04L 9/32* (2006.01)
(Continued)

(52) U.S. Cl.
CPC .......... *H04L 9/3234* (2013.01); *G06F 3/0488* (2013.01); *G06F 21/36* (2013.01);
(Continued)

(58) Field of Classification Search
CPC ..... H04L 41/5067; H04L 67/36; H04L 67/34; H04L 69/18; G06F 3/0488; G06F 21/36
See application file for complete search history.

(56) References Cited

U.S. PATENT DOCUMENTS 8,055,053 B2 * 11/2011 Kwok ............... G06K 17/0022
                                                                235/375
8,504,842 B1    8/2013 Meacham
(Continued)

FOREIGN PATENT DOCUMENTS

CN     101661373 A    3/2010
CN     102016765 A    4/2011
(Continued)

OTHER PUBLICATIONS ip.com, HTTP Extensions for Web Distributed Authoring and Versioning (WebDAV) (RFC4918), an IP.com Prior Art Database Technical Disclosure, IP.com No. IPCOM000154419D, IP.com Electronic Publication: Jul. 1, 2007.
(Continued)

*Primary Examiner* — Mohammad A Siddiqi
(74) *Attorney, Agent, or Firm* — Terrile, Cannatti, Chambers & Holland, LLP; Stephen A. Terrile

(57) ABSTRACT

A token-based method for authenticating a user includes placing a predetermined token (i.e., physical object) at a predetermined location on a touch sensitive device to generate an authentication authorization rather than a traditional text-based, smartcard or biometric method of user authentication. In various embodiments, a plurality of tokens is placed upon the touch sensitive device in a predetermined sequence at predetermined locations to generate an authentication authorization.

6 Claims, 10 Drawing Sheets

(51) Int. Cl.
*H04L 12/24* (2006.01)
*H04L 29/08* (2006.01)
*G06F 3/0488* (2013.01)
*G06F 21/36* (2013.01)
*G09C 5/00* (2006.01)

(52) U.S. Cl.
CPC ............ *G09C 5/00* (2013.01); *H04L 41/5067* (2013.01); *H04L 67/34* (2013.01); *H04L 67/36* (2013.01); *H04L 69/18* (2013.01)

(56) References Cited

U.S. PATENT DOCUMENTS

| | | | | |
|---|---|---|---|---|
| 2003/0217267 | A1* | 11/2003 | Kindberg | H04W 12/06 713/168 |
| 2008/0143476 | A1* | 6/2008 | Kwok | G06K 19/07758 340/5.8 |
| 2009/0002327 | A1* | 1/2009 | Wilson | G06F 3/041 345/173 |
| 2011/0041102 | A1 | 2/2011 | Kim | |
| 2012/0249430 | A1 | 10/2012 | Oster et al. | |
| 2013/0194202 | A1* | 8/2013 | Moberg | G06F 3/044 345/173 |
| 2014/0075552 | A1 | 3/2014 | Guriappa Srinivas et al. | |
| 2014/0089313 | A1* | 3/2014 | Brown | G06F 17/30861 707/740 |

FOREIGN PATENT DOCUMENTS

| | | |
|---|---|---|
| CN | 102982269 A | 3/2013 |
| CN | 103270479 A | 8/2013 |

OTHER PUBLICATIONS ip.com, Application and Use of Surface tabletop computer to geophysical data manipulation and visualization, an IP.com Prior Art Database Technical Disclosure, IP.com No. IPCOM000165673D, IP.com Electronic Publication: Dec. 27, 2007.

Mac Rumors, Extending the Touchscreen with Physical Objects (Video), http://www.macrumors.com/2011/05/12/extending-the-touchscreen-with-physical-objects-video/, May 11, 2011.

International Search Report and Written Opinion for PCT International Application No. PCT/IB2015/058929, dated Mar. 2, 2016.

Appendix P—List of IBM Patents or Applications Treated as Related.

\* cited by examiner

TOKEN AUTHENTICATION FOR TOUCH SENSITIVE DISPLAY DEVICES

CONTINUING DATA

This application is a continuation of U.S. patent application Ser. No. 14/556,697, filed Dec. 1, 2014, entitled "Token Authentication for Touch Sensitive Display Devices" which includes exemplary systems and methods and is incorporated by reference in its entirety.

BACKGROUND OF THE INVENTION

Field of the Invention

The present invention relates in general to the field of computers and similar technologies, and in particular to software utilized in this field. Still more particularly, it relates to a method, system and computer-usable medium for providing token authentication on touch sensitive display devices of computer systems such as tablet type computer systems.

Description of the Related Art

In recent years, there has been a growing awareness of the importance of ensuring the security of information handling systems of all kinds. In response, various approaches to authentication have evolved, including text-based passwords, security tokens (e.g., smartcards, dongles, etc.), and biometrics (e.g., fingerprint readers, retina scanners, etc.). However, the recent advent of portable devices such as cell phones, portable digital assistants (PDAs), and tablet computers pose challenges when implementing these approaches.

As an example, many of these devices now incorporate a touch sensitive screen that can be used as a "virtual" keyboard, which can prove cumbersome to use when entering a text-based password. As a result, some users do not like to use, and are slowed down by, these virtual keyboards. Furthermore, many of these devices also lack biometric readers or ports suitable for the implementation of security tokens.

SUMMARY OF THE INVENTION

More specifically, in one embodiment, the invention relates to a computer-implementable method for authenticating a user, comprising: generating a request for an authentication operation from a user, the request being displayed within a user interface; detecting whether a physical object is placed upon a touch sensitive input device portion of a data processing system in response to the request; analyzing the physical object; performing comparison operations to compare the physical Object to an authentication physical object; and authenticating the user if the physical object corresponds to the authentication physical object.

In another embodiment, the invention relates to a system comprising: a processor; a data bus coupled to the processor; and a computer-usable medium embodying computer program code, the computer-usable medium being coupled to the data bus. The computer program code used for authenticating a user and comprises instructions executable by the processor and configured for: generating a request for an authentication operation from a user, the request being displayed within a user interface; detecting whether a physical object is placed upon a touch sensitive input device portion of a data processing system in response to the request; analyzing the physical object; performing comparison operations to compare the physical object to an authentication physical object; and authenticating the user if the physical object corresponds to the authentication physical object.

In another embodiment, the invention relates to a non-transitory, computer-readable storage medium embodying computer program code, the computer program code comprising computer executable instructions configured for: generating a request for an authentication operation from a user, the request being displayed within a user interface; detecting whether a physical object is placed upon a touch sensitive input device portion of a data processing system in response to the request; analyzing the physical object; performing comparison operations to compare the physical object to an authentication physical object; and authenticating the user if the physical object corresponds to the authentication physical object.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
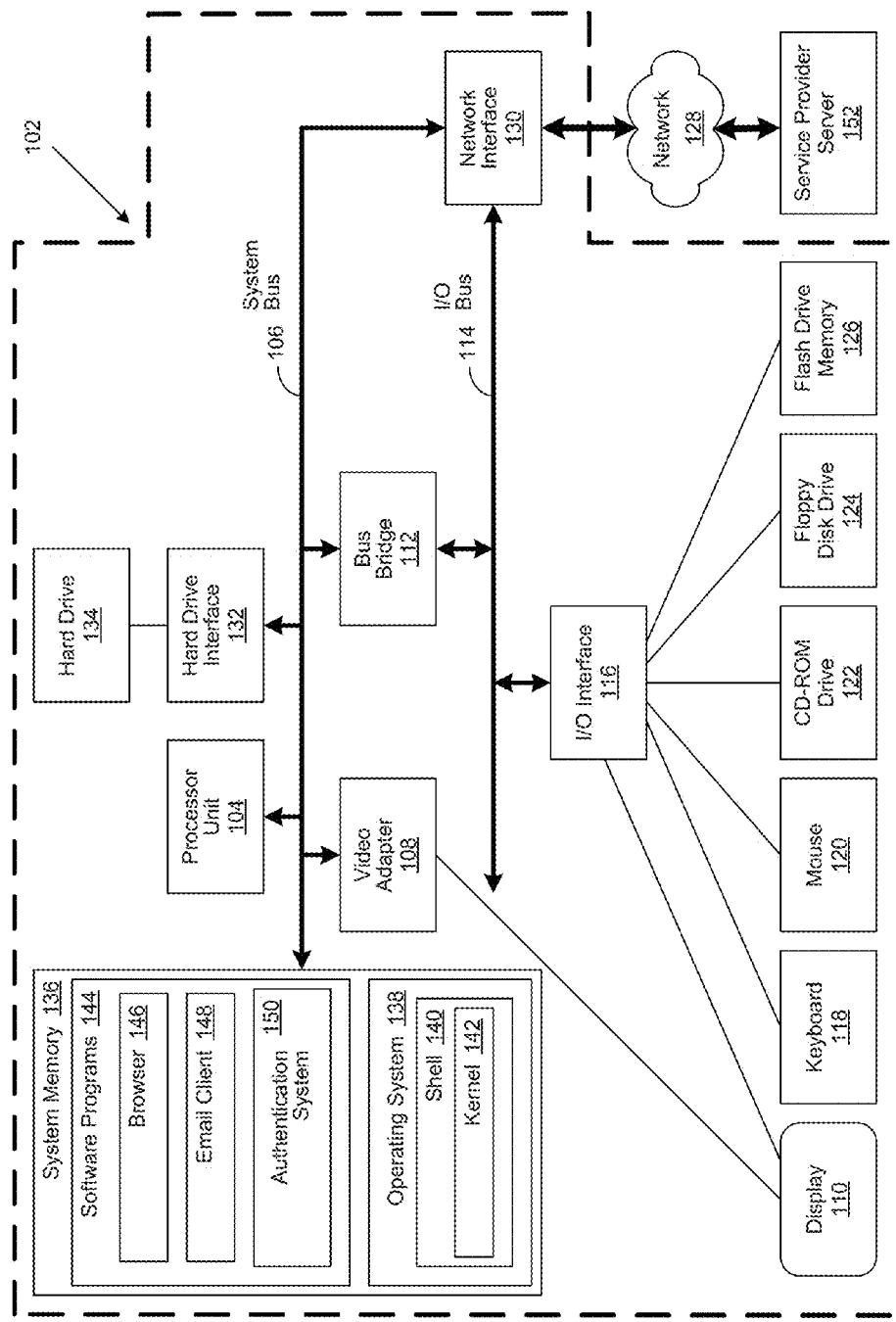
FIG. 1 shows an exemplary client computer in which the present invention may be implemented.

In accordance with the present invention, a token-based method for authenticating a user is disclosed. More specifically, the token-based method for authenticating a user includes placing a predetermined token at a predetermined location on a touch sensitive device to generate an authentication authorization rather than a traditional text-based, smartcard or biometric method of user authentication. In various embodiments, a plurality of tokens are placed upon the touch sensitive device in a predetermined sequence at predetermined locations to generate an authentication authorization.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in a token oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110 (which is a touch sensitive display), is also coupled to system bus 106. In certain embodiments, the touch sensitive display comprises a high sensitive touch sensitive display (i.e., a touch sensitive display having sufficient sensing granularity to enable sensing of characteristics of physical objects placed in close proximity with the touch sensitive display). System bus 106 is coupled via a bus bridge 112 to an Input/Output (I/O) bus 114. An I/O interface 116 is coupled to I/O bus 114. The I/O interface 116 affords communication with various I/O devices, including the touch sensitive display, a keyboard 118, a mouse 120, a Compact Disk—Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include an authentication system 150. In these and other embodiments, the authentication system 150 includes code for implementing the processes described hereinbelow. In one embodiment, client computer 102 is able to download the authentication system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. It will be appreciated that when the client computer 102 is a portable device such as a tablet type computer then some of the components may not be included within the computer. These and other variations are intended to be within the spirit, scope and intent of the present invention.

Figure 2:
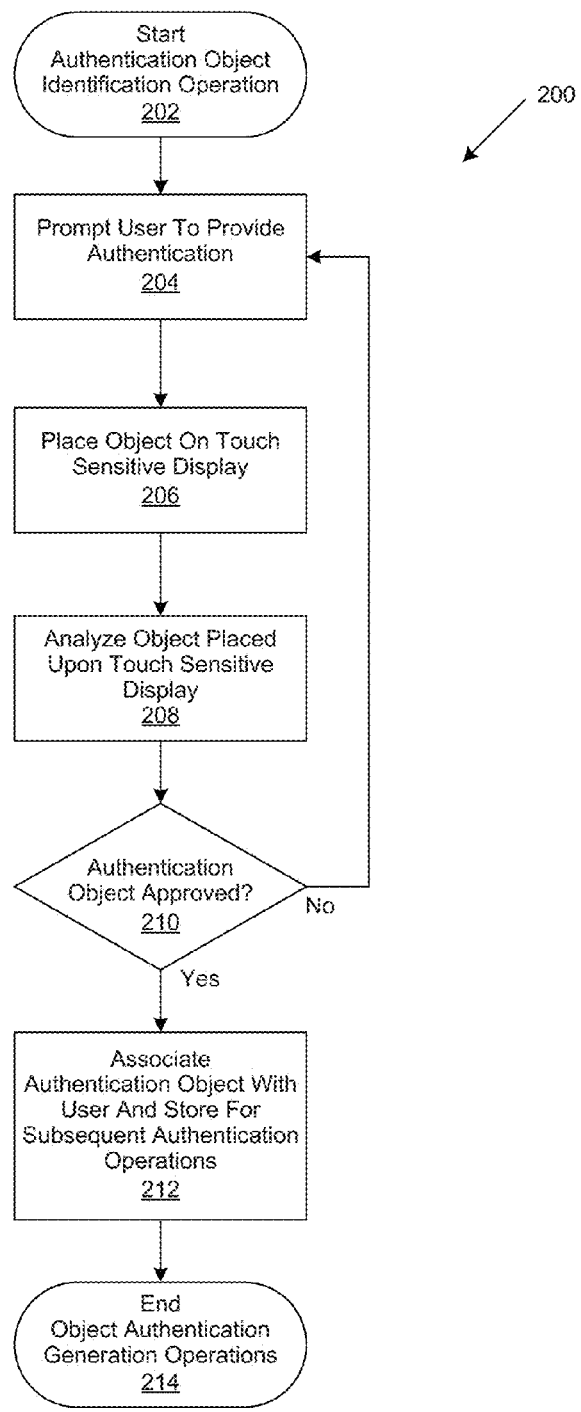
FIG. 2 shows a flow chart of an authentication token generation operation.

FIG. 2 shows a flowchart of an authentication token generation operation implemented in accordance with an embodiment of the invention. In this embodiment, authentication token recording operations are begun in step 202, followed by the user of a device being prompted in step 204 to provide a token (i.e., a physical object) for authentication for use in subsequent authentication operations. The token is then placed on the touch sensitive display in step 206 and processed in step 206 to generate an authentication token file. The resulting authentication token is then analyzed in step 208, followed by a determination being made in step 210 whether the authentication token is approved. If the token is not approved, then the process is continued, proceeding with step 204. As an example, the user may be dissatisfied with their original token and may wish to use a different token or different orientation for the authentication token. However, if the authentication token is approved by the user, then the authentication token is associated with the user and then stored for subsequent user authentication operations in step 212. Token authentication generation operations are then ended in atop 214. In certain embodiments, in addition to physical characteristics of the token such as the shape and size of the token, the token comprises additional identification characteristics. Additionally, in certain embodiments the additional identification characteristics comprise REID information, barcode information and/or quick response (QR) information.

Figure 3:
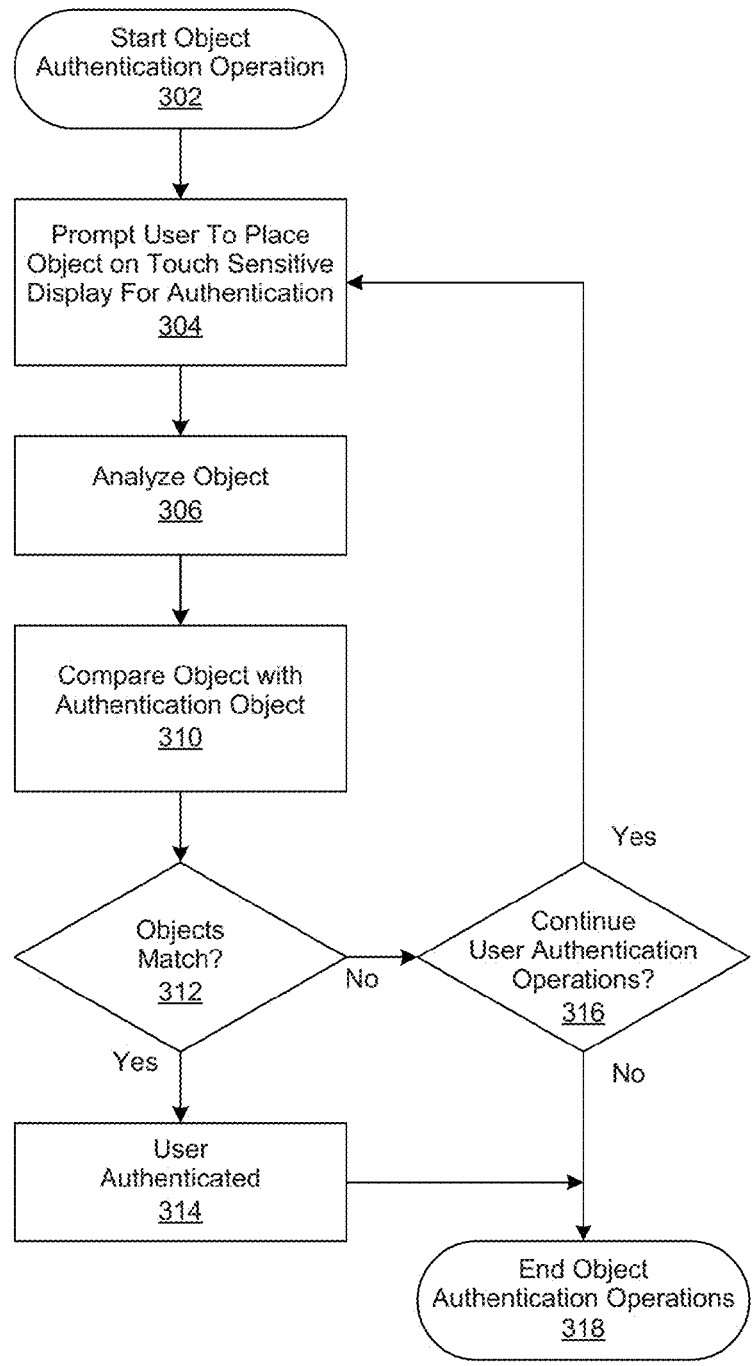
FIG. 3 shows a flow chart of an authentication token authentication operation.

FIG. 3 shows a flowchart of a token authentication operation implemented in accordance with an embodiment of the invention. In this embodiment, token authentication operations are begun in step 302, followed by the user of a device being prompted in step 304 to place a token upon the touch sensitive device for authentication. The token is analyzed in step 306. Comparison operations are then performed in step 310 to compare the token to an authentication token previously associated with the user. A determination is then made in step 312 whether or not the tokens match one another. If so, then the user is authenticated in step 314. Otherwise, a determination is made in step 316 whether to continue authentication operations. If so, then the process is continued, proceeding with step 304. As an example, the token may need to be placed upon the touch sensitive display in a different orientation. However, if it is determined in step 316 to discontinue authentication operations, or once the user is authenticated in step 314, then authentication operations are ended in step 318.

Figure 4:
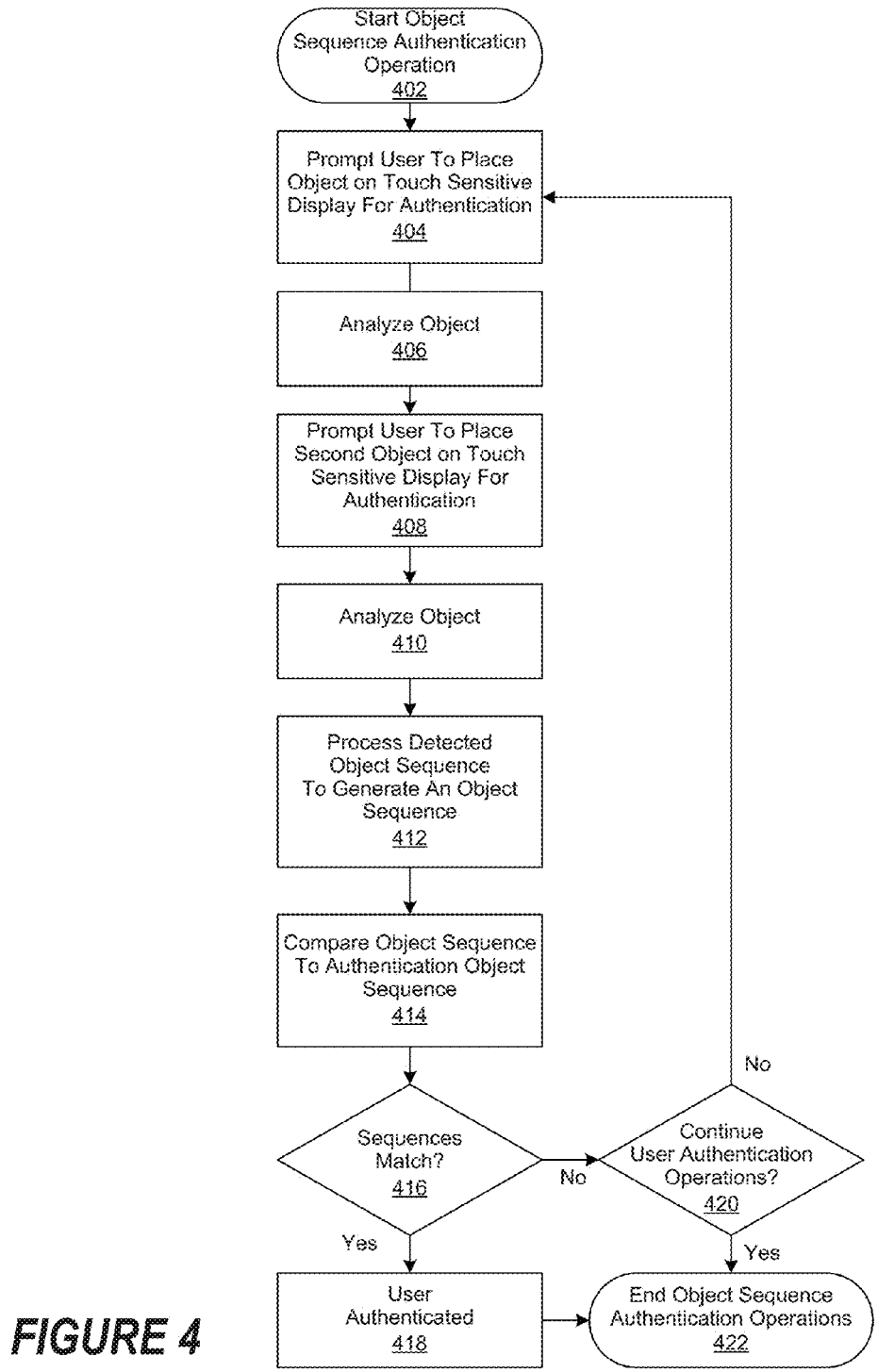
FIG. 4 shows a flow chart of another authentication token authentication operation.

FIG. 4 shows a flowchart of another token authentication operation implemented in accordance with an embodiment of the invention. In this embodiment, token authentication operations are begun in step 402, followed by the user of a device being prompted in step 404 to place a token upon the touch sensitive device for authentication. The token is analyzed in step 406. Next, the user is prompted in step 408 to place another token upon the touch sensitive device for authentication. This token is also analyzed in step 410. Next, the operation processes the detected token sequence to generate a token sequence at step 412. Comparison operations are then performed in step 414 to compare the tokens as well as the token placement sequence to an authentication token sequence previously associated with the user. A determination is then made in step 416 whether or not the tokens and the placement sequence match one another. If so, then the user is authenticated in step 418. Otherwise, a determination is made in step 420 whether to continue authentication operations. If so, then the process is continued, proceeding with step 404. As an example, one or more of the tokens may need to be placed upon the touch sensitive display in a different orientation or with a different placement sequence. However, if it is determined in step 420 to discontinue authentication operations, or once the user is authenticated in step 418, then authentication operations are ended in step 422.

Figure 5:
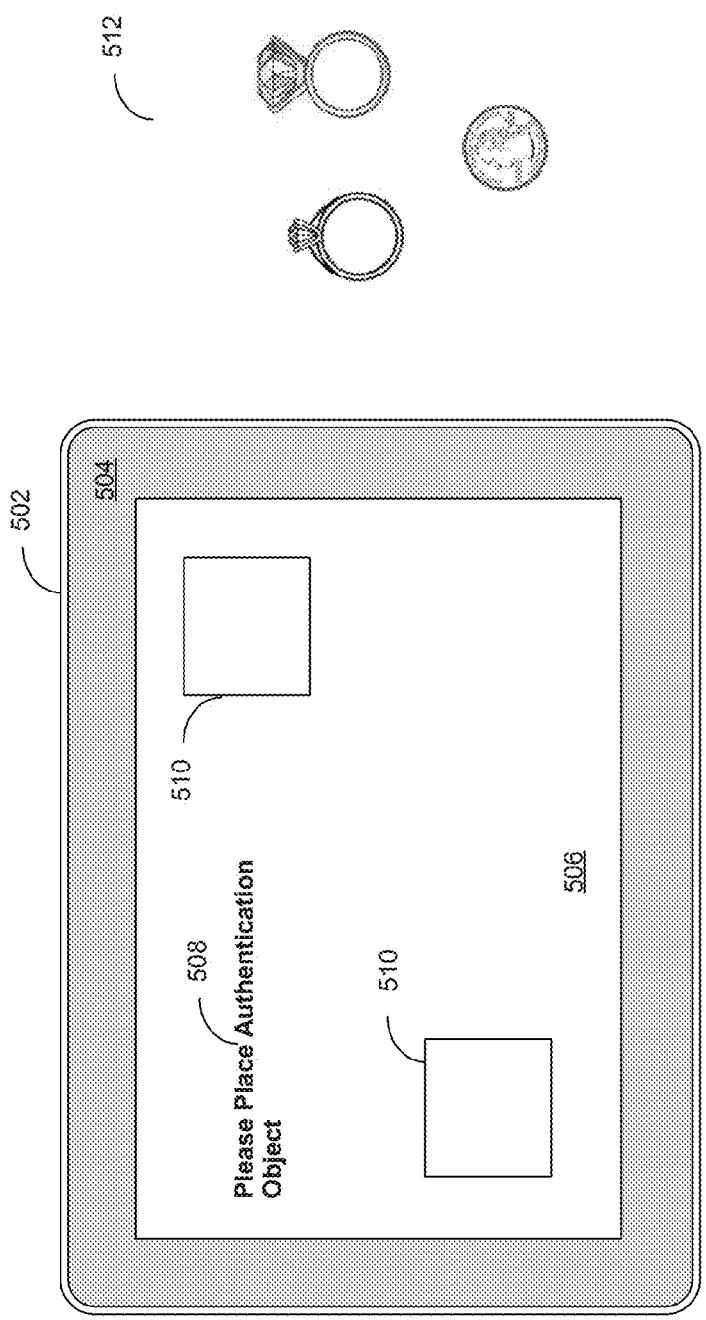
FIG. 5 shows a diagrammatic representation of a user device having touch sensitive screen.

FIG. 5 shows a diagrammatic representation of a touch sensitive screen implemented in accordance with an embodiment of the invention for generating a token authentication operation. In various embodiments, a user device 502, such as a computer described in greater detail herein, includes a touch sensitive input device, such as a touch pad or a touch sensitive display 504. In these various embodiments, a request 508 is displayed within a user interface 506 of the user device 502, prompting a user to place an authentication token upon the touch sensitive input device. In certain embodiments, the display may present one or more indicia 510 for where the authentication token should be placed. Any of a plurality of tokens, such as the example tokens 512 may be used as authentication tokens.

In this embodiment, the user of the user device 502 is prompted to use the touch sensitive display 504 to place an authentication token upon the touch sensitive display. Once detected, the authentication token is processed and is subsequently used to authenticate the user. In one embodiment, the authentication token is locally stored in a target device, such as the user device 502, where it wilt be used for user authentication. In another embodiment, the authentication token is remotely stored and accessed by one or more target devices, such as the user device 502, which will then use it for user authentication.

Figure 6:
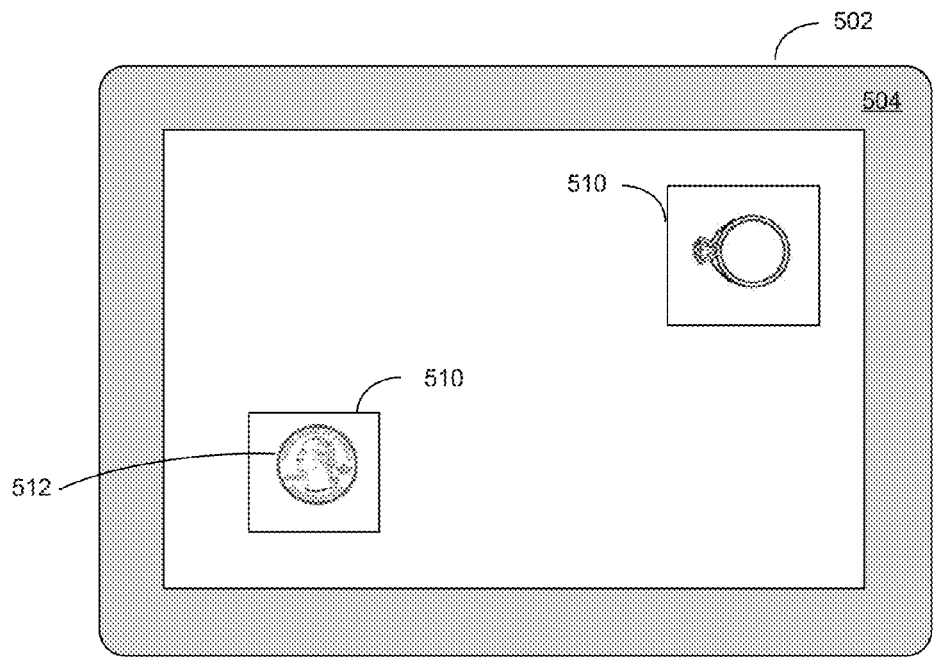
FIG. 6 shows a diagrammatic representation of a user device performing a token authentication operation.

FIG. 6 shows a diagrammatic representation of a user device having touch sensitive screen performing a token authentication operation. In various embodiments, custom tokens are placed upon the touch sensitive input device, such as a touch pad or a touch sensitive display 504. In certain embodiments, the custom token may comprise RFID information, a bar code information or a custom two dimensional code. Also, in certain embodiments, the custom characteristics may include characteristics selected to appeal to certain users, e.g., affinity objects shaped as a school or professional team logo that are sold separately from non-custom tokens. The user device then recognizes and identifies characteristics of the tokens. The characteristics can include some or all of the weight, size, dimensions, orientation and shape of the tokens. In certain embodiments, the user device also considers an order or sequence in which the tokens are placed upon the touch sensitive display 504.

Figure 7:
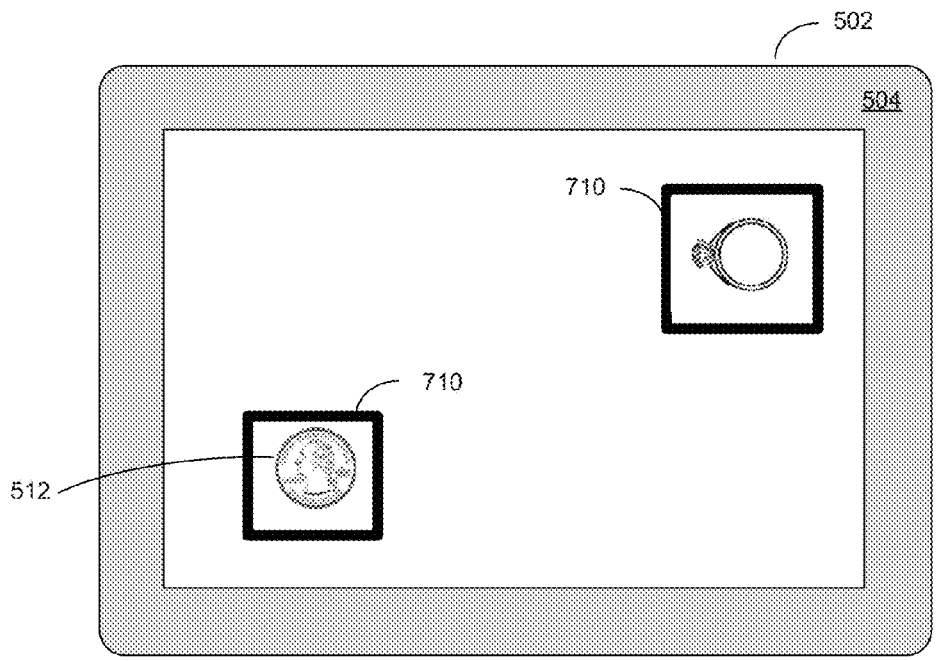
FIG. 7 shows a diagrammatic representation of a user device having touch sensitive screen performing a token authentication operation.

FIG. 7 shows a diagrammatic representation of a user device performing a token authentication operation. More specifically, after the token or tokens are placed upon the touch sensitive display, an authentication system associated with the user device (e.g., authentication system 150), recognizes and identifies the tokens based upon their characteristics as matching the predefined criteria for security and allows the requested action/function on the device. For example, in certain embodiments, the user device allows the user access device or automatically logs the user into certain user accounts. Also, in certain embodiments, the authentication system causes touch sensitive display to provide a visual indicia 710 that the authentication has been approved. For example, in certain embodiments, the visual indicia may include a green highlighting of the placement indicia 510.

Figure 8:
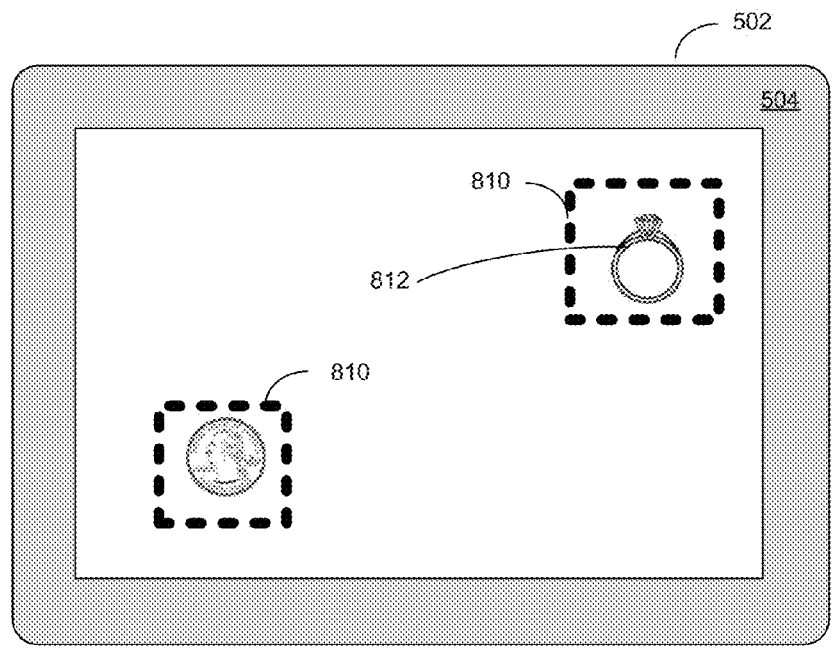
FIG. 8 shows a diagrammatic representation of a user device performing a token authentication operation.

FIG. 8 shows a diagrammatic representation of a user device performing a token authentication operation. More specifically, after the token or tokens are placed upon the touch sensitive display, an authentication system associated with the user device (e.g., authentication system 150), recognizes and identifies the tokens based upon their characteristics of the tokens. In this example, one token characteristic does not match. For example, the ring 812 does not match the predefined criteria in that the orientation of the ring is different from that of the previously defined token authentication. Also, in certain embodiments, the authentication system causes touch sensitive display to provide a visual indicia 810 that the authentication has not been approved. For example, in certain embodiments, the visual indicia may include a red highlighting of the placement indicia 510.

Figure 9:
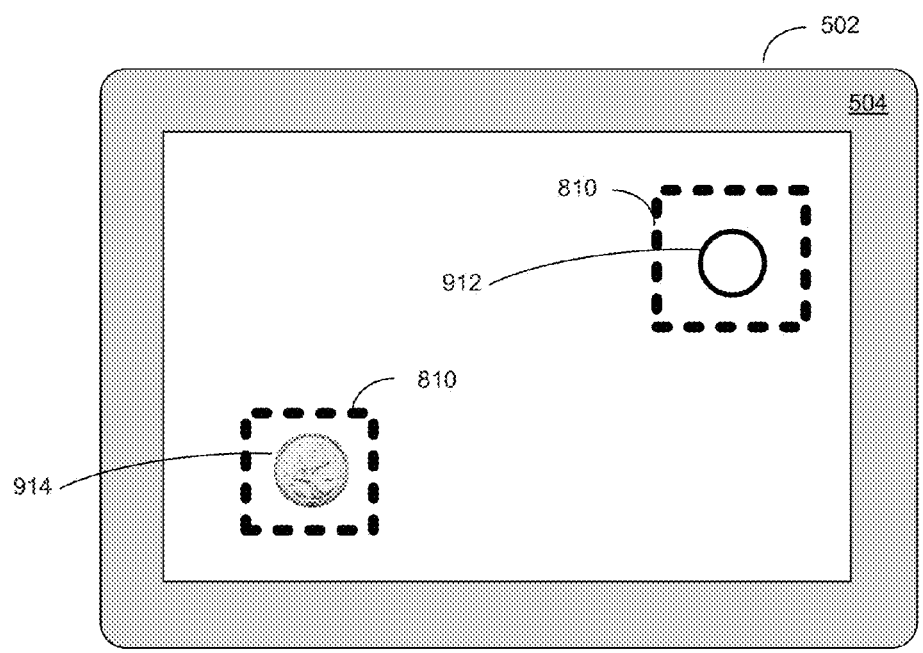
FIG. 9 shows a diagrammatic representation of a user device performing a token authentication operation.

FIG. 9 shows a diagrammatic representation of a user device performing a token authentication operation. More specifically, after the token or tokens are placed upon the touch sensitive display, an authentication system associated with the user device (e.g., authentication system 150), recognizes and identifies the tokens based upon their characteristics of the tokens. In this example, two token characteristics do not match. For example, the ring 912 does not match the predefined criteria in that the shape of the ring is different from that of the previously defined token authentication. Also, the coin 914 does not match in that the coin is a Canadian quarter having a different face than that of the authentication token. In certain embodiments, the authentication system causes touch sensitive display to provide a visual indicia 810 that the authentication has not been approved. For example, in certain embodiments, the visual indicia may include a red highlighting of the placement indicia 510.

Figure 10:
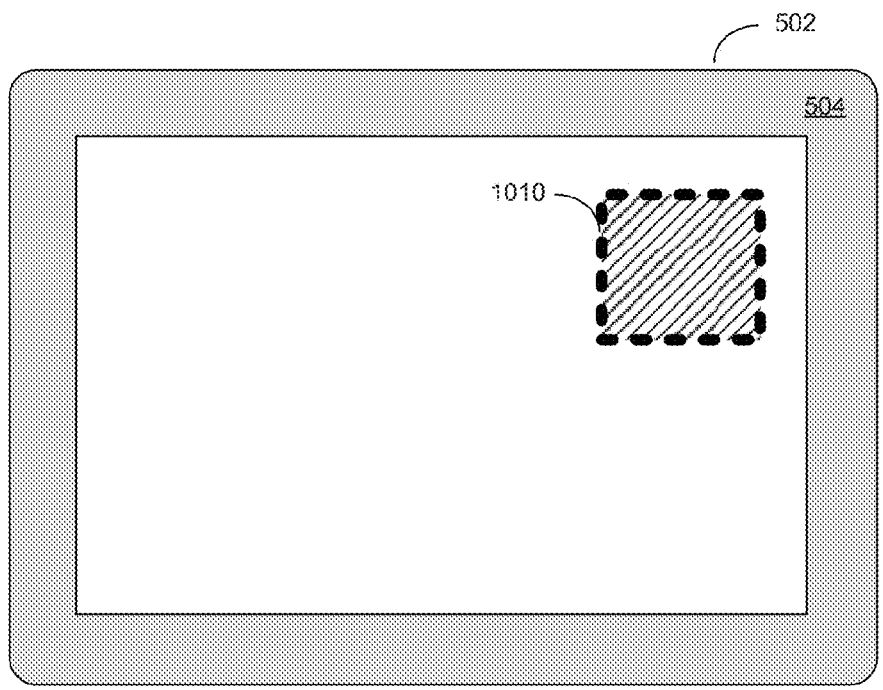
FIG. 10 shows a diagrammatic representation of a user device performing a token authentication operation.

FIG. 10 shows a diagrammatic representation of a user device performing a token authentication operation. More specifically, in certain embodiments, the authentication system causes touch sensitive display to provide an instructional visual indicia 1010. For example, in certain embodiments, the instructional visual indicia may include a highlighting of the placement indicia 510. In this embodiment, when multiple tokens are assigned, the authentication system could test a user by highlighting an area of the display and then prompting the user for the appropriate token to be placed.

Figure 11:
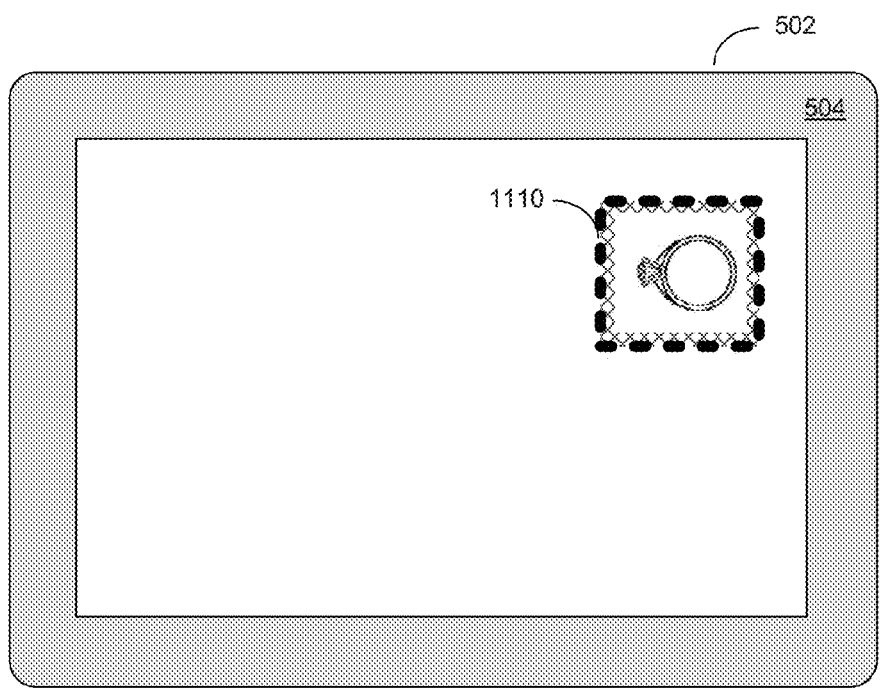
FIG. 11 shows a diagrammatic representation of a user device performing a token authentication operation.

FIG. 11 shows a diagrammatic representation of a user device performing a token authentication operation. More specifically, in certain embodiments, the authentication system causes touch sensitive display to provide an acceptance visual indicia 1110 when a correct token is used. For example, in certain embodiments, the acceptance visual indicia may include a different color of highlighting of the placement indicia 510. In this embodiment, upon acceptance of the token, the system proceeds with the appropriate authentication operation.

Figure 12:
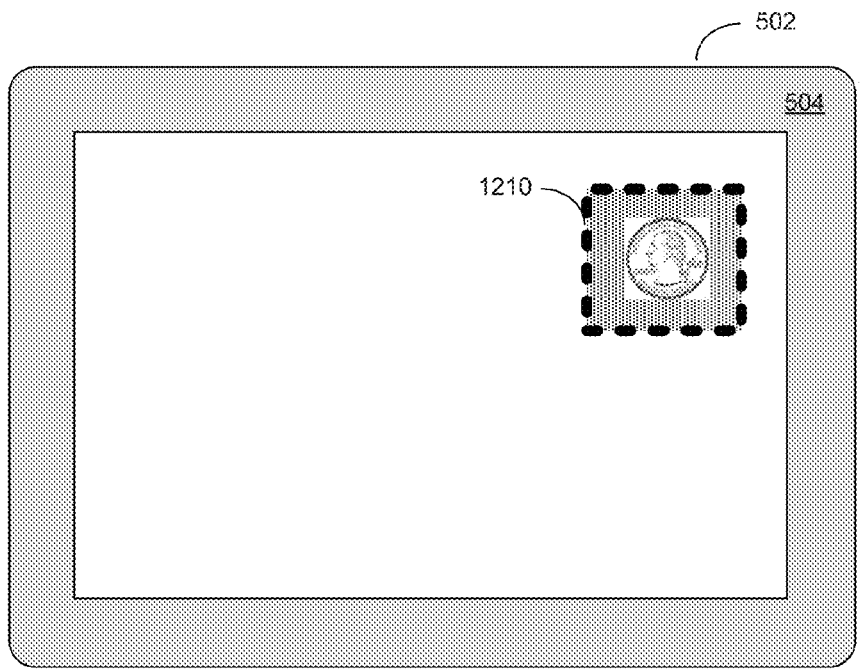
FIG. 12 shows a diagrammatic representation of a user device performing a token authentication operation.

FIG. 12 shows a diagrammatic representation of a user device performing token authentication operation. More specifically, in certain embodiments, the authentication system causes touch sensitive display to provide a denial visual indicia 1110 when an incorrect token is used. For example, in certain embodiments, the acceptance visual indicia may include a different color of highlighting of the placement indicia 510.

Figure 13:
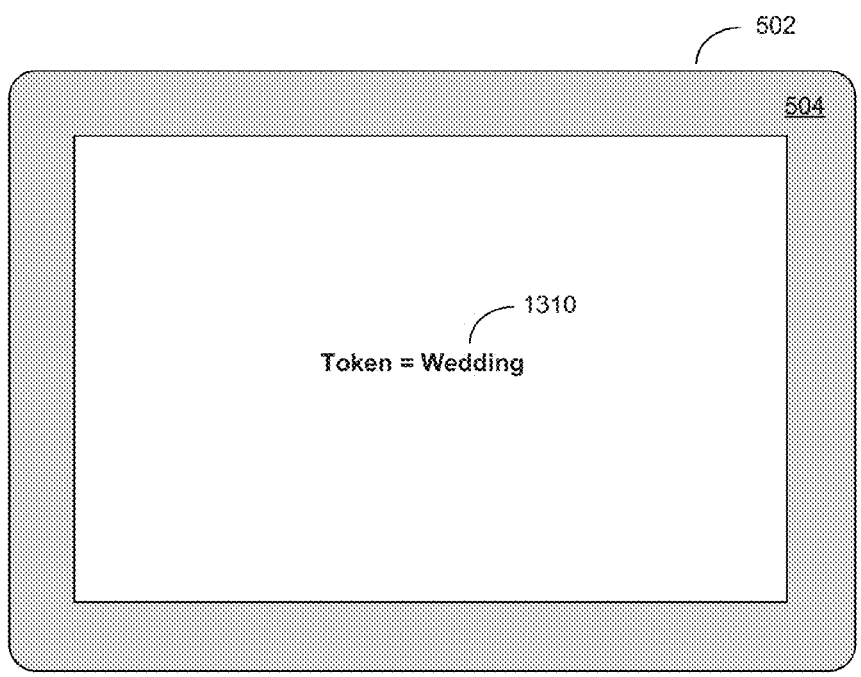
FIG. 13 shows a diagrammatic representation of a user device performing a token authentication operation.

FIG. 13 shows a diagrammatic representation of a user device performing a token authentication operation. More specifically, in certain embodiments, the authentication system causes touch sensitive display to provide a hint 1310 to the user upon a certain number of denials of the authentication system. For example, the authentication system could display a token hint of a wedding, which a user would recognize as their wedding data and prompt them to place their wedding ring on the touch sensitive display device. In certain embodiments, this hint or clue could be provided by the user to the authentication system such as during the authentication token generation operation. Also, in certain embodiments, this hint or clue could be provided during the authentication token generation operation. Also, in certain embodiments, the hint can include a written or verbal hint such as "Wrong object", "Wrong orientation" or the like.

Figure 14:
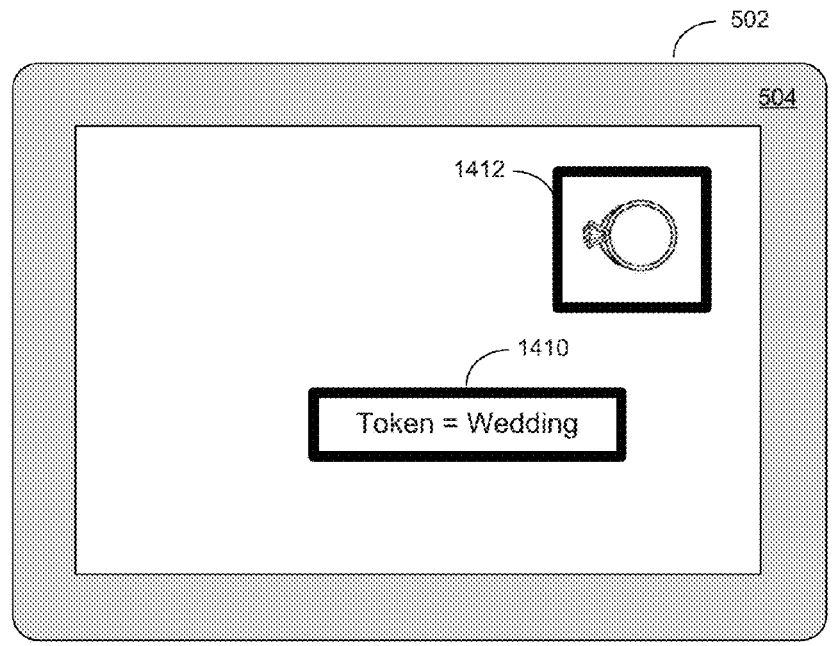
FIG. 14 shows a diagrammatic representation of a user device performing a token authentication operation.

FIG. 14 shows a diagrammatic representation of a user device performing a token authentication operation. More specifically, in certain embodiments, the authentication system causes touch sensitive display to provide a hint indicia 1410 to the user when the correct token is placed onto the touch sensitive display device. Additionally, in certain embodiments, the indicia can further include a highlighted acceptance indicia 1412 provided at the location of the placement of the token.

Figure 15:
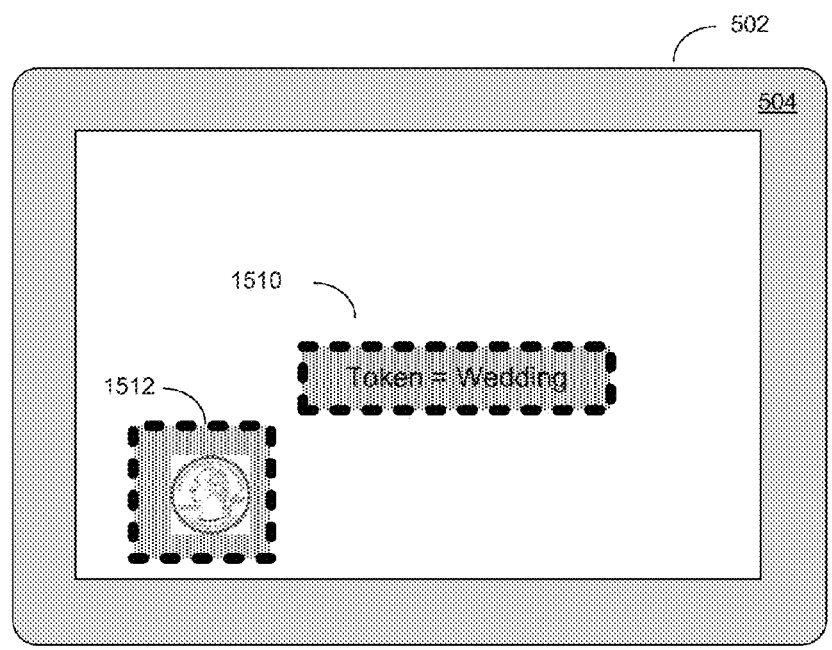
FIG. 15 shows a diagrammatic representation of a user device performing a token authentication operation.

FIG. 15 shows a diagrammatic representation of a user device performing a token authentication operation. More specifically, in certain embodiments, the authentication system causes touch sensitive display to provide a hint rejection indicia 1510 to the user when an incorrect token is placed onto the touch sensitive display device. Additionally, in certain embodiments, the indicia can further include a highlighted rejection indicia 1512 provided at the location of the placement of the rejected token.

Although the present invention has been described in detail, it should be understood that various changes, substitutions and alterations can be made hereto without departing from the spirit and scope of the invention as defined by the appended claims.

What is claimed is:

1. A computer-implementable method for authenticating a user, comprising:
 presenting an indicia on a touch sensitive input device portion, the indicia indicating where an authentication token should be placed on the touch sensitive input device portion;

detecting whether a physical object is placed upon a touch sensitive input device portion of a data processing system in response to the request;

analyzing the physical object;

performing comparison operations to compare the physical object to an authentication physical object, the comparison operations comprising comparing at least one physical characteristic of the physical object with a similar characteristic of the authentication physical object, the at least one physical characteristic being selected from a group comprising a size of the physical object, dimensions of the physical object, an orientation of the physical object and a shape of the physical object; and authenticating the user if the physical object placed upon the portion of the touch sensitive input device corresponds to the authentication physical object, the authenticating generating an authentication authorization to allow the user access to a device associated with the touch sensitive input device portion.

2. The method of claim 1, further comprising:

generating a request for an authentication operation from a user, the request being displayed within a user interface.

3. The method of claim 1, wherein:

the comparison operations comprise comparing another characteristic of the physical object with a similar characteristic of the authentication physical object; and, the another characteristic is selected from a group of characteristics comprising a weight of the physical object, and another of the size of the physical object, the dimensions of the physical object, the orientation of the physical object and the shape of the physical object.

4. The method of claim 3, wherein:

the touch sensitive input device portion comprises sufficient sensing granularity to enable sensing of the at least one characteristic.

5. The method of claim 1, further comprising:

detecting whether a second physical object is placed upon the touch sensitive input device portion;

analyzing the second physical object;

performing comparison operations to compare the second physical object to a second authentication physical object; and, authenticating the user if the second physical object corresponds to the second authentication physical object.

6. The method of claim 5, further comprising:

analyzing an order of placement of the physical object and the second physical object; and, authenticating the user when the order of placement of the physical object and the second physical object corresponds to an authentication order of placement.

* * * * *